US012696093B1

(12) United States Patent
Vantieghem et al.

(10) Patent No.: US 12,696,093 B1
(45) Date of Patent: Jul. 28, 2026

(54) SECURITY APPLICATION AND METHODS FOR BECOMING AND STAYING CYBER RESILIENT

(71) Applicants: Brigitte Vantieghem, Milton, GA (US); Francis Chlarie, Bruges (BE)

(72) Inventors: Brigitte Vantieghem, Milton, GA (US); Francis Chlarie, Bruges (BE)

( * ) Notice: Subject to any disclaimer, the term of this patent is extended or adjusted under 35 U.S.C. 154(b) by 375 days.

(21) Appl. No.: 18/084,838

(22) Filed: Dec. 20, 2022

Related U.S. Application Data

(60) Provisional application No. 63/291,897, filed on Dec. 20, 2021.

(51) Int. Cl.
| | |
|---|---|
| *H04W 12/121* | (2021.01) |
| *H04L 9/40* | (2022.01) |
| *H04W 84/12* | (2009.01) |

(52) U.S. Cl.
CPC ....... *H04W 12/121* (2021.01); *H04L 63/1433* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 10,938,816 | B1* | 3/2021 | Belton, Jr. .......... | H04L 63/1433 |
| 12,130,937 | B1* | 10/2024 | Fakhraie ............ | G06Q 30/0609 |
| 2009/0199298 | A1* | 8/2009 | Miliefsky ............... | H04L 63/20 |
| | | | | 709/217 |
| 2013/0016628 | A1* | 1/2013 | Bertani ................. | H04L 41/046 |
| | | | | 370/255 |
| 2020/0213352 | A1* | 7/2020 | Fainberg ............. | H04L 63/0853 |
| 2020/0404502 | A1* | 12/2020 | Trivellato ............. | H04W 48/16 |
| 2021/0334386 | A1* | 10/2021 | AlGhamdi .......... | H04L 63/1433 |
| 2022/0272067 | A1* | 8/2022 | Ota ......................... | H04L 41/12 |

* cited by examiner

*Primary Examiner* — Linglan Edwards
*Assistant Examiner* — Kamryn J Gillespie

(57) ABSTRACT

Methods can be provided for reducing risks of being a target of cyber attacks, or a data breach of personal data, or impersonation or theft of a digital identity, etc. Such methods may be implemented, for example, via a security application.

7 Claims, 16 Drawing Sheets

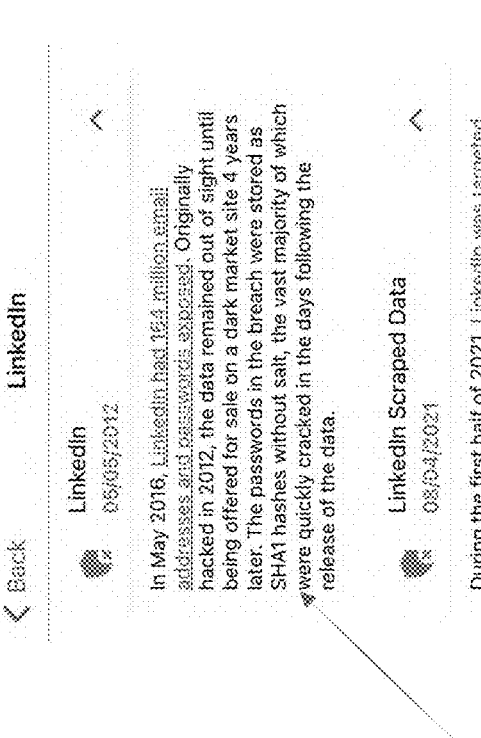

LinkedIn
05/05/2012

In May 2016, LinkedIn had 164 million email addresses and passwords exposed. Originally hacked in 2012, the data remained out of sight until being offered for sale on a dark market site 4 years later. The passwords in the breach were stored as SHA1 hashes without salt, the vast majority of which were quickly cracked in the days following the release of the data.

LinkedIn Scraped Data
08/04/2021

During the first half of 2021, LinkedIn was targeted by attackers who scraped data from hundreds of millions of public profiles and later sold them online. Whilst the scraping did not constitute a data breach nor did it access any personal data not intended to be publicly accessible, the data was still monetised and later broadly circulated in hacking circles. The scraped data contains approximately 400M records with 125M unique email addresses, as well as names, geographic locations, genders and job titles. LinkedIn specifically addresses the incident in their post on An update on report of scraped data.

Data Breaches

Verify if your email address is leaked
from websites ateliware@ateliware.com

No website with your address are found.

syss@ateliware.com

Match

Canva

Figure 8:
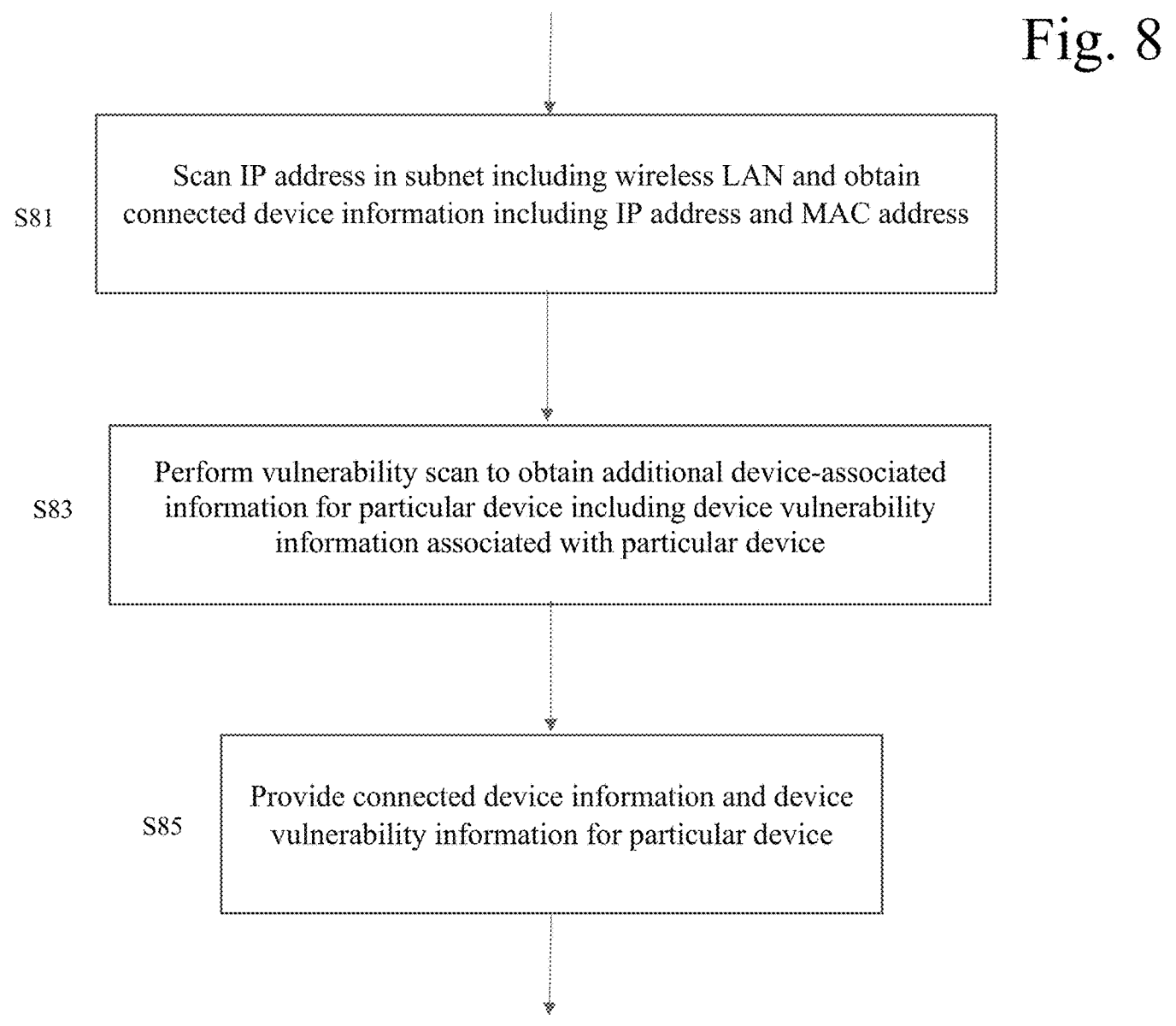

Scan IP address in subnet including wireless LAN and obtain connected device information including IP address and MAC address

S83

Perform vulnerability scan to obtain additional device-associated information for particular device including device vulnerability information associated with particular device

S85

Provide connected device information and device vulnerability information for particular device S91 Perform ping scan or ping sweep S92 Perform additional scan(s)

S94 Maintain device scan database

S95 Save result of additional scan

S97 Display device type and device name

S98 Permit displayed information to be modified

S99 Conforming device scan database

S106 — Determine required action

S108 — Display helpdesk contact for obtaining guidance

S101 — Maintain vulnerability scan database

S103 — Register device vulnerability information

| | |
|---|---|
| Determine action that is required as to open port | S116 |
| Display helpdesk contact for obtaining guidance | S118 |

| | |
|---|---|
| S111 | Determine open ports |
| S113 | Describe actions permitted via open port |

Fig. 12

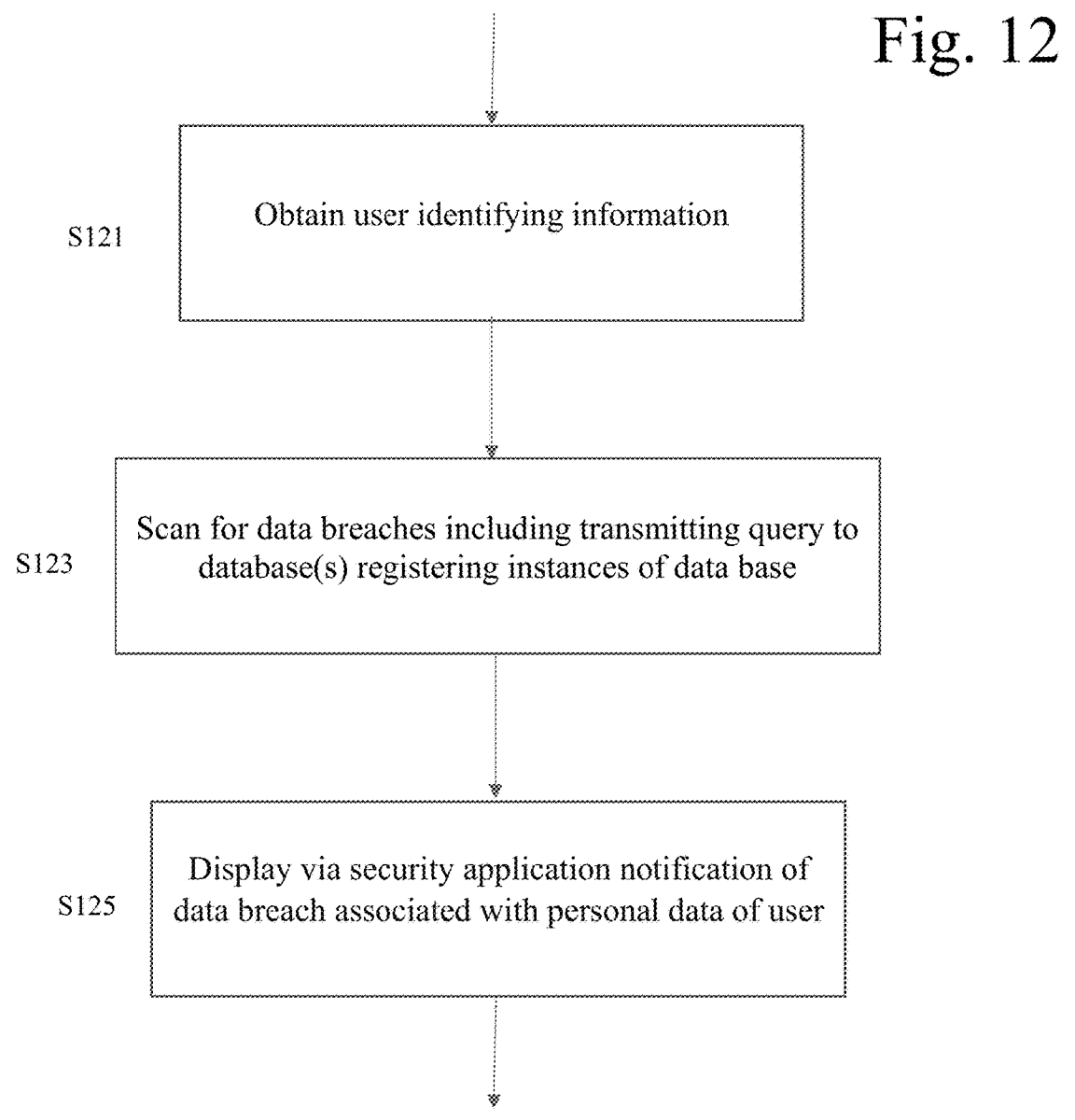

Obtain user identifying information

S121

Scan for data breaches including transmitting query to database(s) registering instances of data base

S123

Display via security application notification of data breach associated with personal data of user

S125

S141

Obtain user identifying information

S143

Scan target social media based on username and plural string permutations of username

S145

Display notification of matches of social media sites

SECURITY APPLICATION AND METHODS FOR BECOMING AND STAYING CYBER RESILIENT

CROSS-REFERENCE TO RELATED APPLICATION

This application claims the benefit of U.S. Provisional Application No. 63/291,897 filed on Dec. 20, 2021, which is incorporated herein by reference in its entirety.

TECHNICAL FIELD

This application relates to tools (e.g., a method, application software, a system, etc.) for becoming and staying cyber resilient (e.g., against cyber attacks, data breach of personal data, impersonation or theft of digital identity of user, etc.).

BACKGROUND

Every user of a Wi-Fi, such as members of a household in the case of a home Wi-Fi, can be the victim of a cyber-attack. From identity theft to phishing and phone or social media scams, cybercrime is rising, as criminals find new ways to exploit vulnerabilities in your home network. For example, people over 60 are commonly targeted and such scams account for approximately 25% of all cyber-crime attacks, causing an average annual loss of approximately $853 million due to cybercrime. As another example of misuse of cyber technology, children can experience cyberbullying from their peers, particularly in their teenage years.

Also, there is a need to protect one's digital live when one travels. People are more vulnerable to cyber intrusions when they travel. People are often distracted when they are away from home, and consequently may sometimes opt for convenience over security. More than 70 percent of travelers connect to a public Wi-Fi, charge a device on a public USB station or enable auto-connect on their wireless devices, which are just some examples of high-risk behaviors, increasing their vulnerability to hackers.

Further, many employers recognize a need to protect their employees when working from home. It has been estimated that 62% of employed Americans worked at home during the COVID-19 pandemic. Employer supplied computing devices are protected, but home networks typically do not meet company-graded security. Such network may be shared by other members of the household (and perhaps by visitors), such as for gaming or other entertainment, shopping, banking, etc.

There continues to be a need for tools or provisions to protect people who use a wireless local area network (LAN), or another digital environment, and to help them become and stay cyber resilient.

BRIEF SUMMARY

This application provides a disclosure of various inventive aspects that may be implemented, singly or in combination, to protect people who use digital tools, e.g., computers, smartphones, other devices having a digital assistant integrated with a voice interface, such as in an IoT (Internet of Things) environment, etc., in their daily activities (i.e., virtually anyone and everyone). The following is merely a brief summary of some of such aspects.

According to one aspect of this disclosure, a method performed by a security application may be provided for reducing risk of cyber-attack of a user terminal connected via a router to a local wireless LAN (local area network). Such method can include various aspects, for example, including: (a) scanning each IP address in a subnet including the local wireless LAN, to determine devices which are connected to the wireless LAN, and obtaining, for each particular device amongst the devices connected to the wireless LAN, connected device information specific to the particular device, the connected device information including an IP address of the local wireless LAN and a MAC (media access control) address uniquely associated with a network interface controller of the particular device; (b) performing a vulnerability scan, for the each particular device determined in (a) to be connected to the wireless LAN, including using the MAC address uniquely associated with the network interface controller of the particular device, to obtain additional device-associated information from a data source or external database which is external to the wireless LAN, the additional device-associated information for at least one of the each particular device including device vulnerability information associated with the particular device; and (c) displaying on the user terminal, for the each particular device determined in (a) to be connected to the wireless LAN, the connected device information and the device vulnerability information, in a user-comprehensible manner.

According to another aspect of this disclosure, a method performed by a security application may be provided for reducing risk from data breach of personal data of a user of the security application. Such method can include various aspects, for example, including: (A) obtaining user-identify information of the user, the user-identifying information including at least one of an email address of the user and a phone number of the user; (B) scanning for data breaches, including transmitting a query, based on the user-identifying information, to each of one or more data breach database registering known instances of data breach associated with the user-identifying information; and (C) when a response to the query includes data breach information indicating one or more data breaches that match the query based on the user-identifying information, transmitting to the user, or displaying via the security application on a client terminal of the user, a notification of the data breaches associated with the personal data of the user.

According to another aspect of this disclosure, a method performed by a security application executing on at least one computer may be provided for reducing risk from impersonation of a user of the security application on internet websites. Such method can include various aspects, for example, including: (I) obtaining user-identify information of the user, the user-identifying information including one or more usernames of the user; (II) communicating with each target social media amongst one or more social media sites, via an API (Application Programming Interface) of the target social media, to scan the target social media for each username amongst the one or more usernames of the user, based on the username and plural string permutations of the username; and (III) when communications with the respective social media yield matches based on scans for the username and the string permutations of the username, compiling results of the matches and displaying via the security application on a client terminal of the user a notification of the matches on the social media sites.

Many other inventive aspects would also be apparent from reading the detailed description that follows, and/or from reading the listing of claims appended to the detailed description

BRIEF DESCRIPTION OF THE DRAWINGS

The features of the subject matter of this disclosure can be more readily understood from the following detailed description with reference to the accompanying drawings wherein:

FIG. 5 shows a schematic representation of a method that can be performed by a security application, such as shown in FIGS. 4A-4D;

FIG. 6 shows a flow chart of a method that can be performed by a security application, such as shown in FIGS. 4A-4D;

FIG. 7A shows a schematic representation of a data breach scan function, such as shown in FIG. 4C;

FIG. 8 shows a flow chart of a method that can be performed by a security application, such as shown in FIGS. 4A-4D;

FIG. 12 shows a flow chart of a method that can be performed by a security application, such as shown in FIGS. 4A-4D;

DETAILED DESCRIPTION

Figure 1:
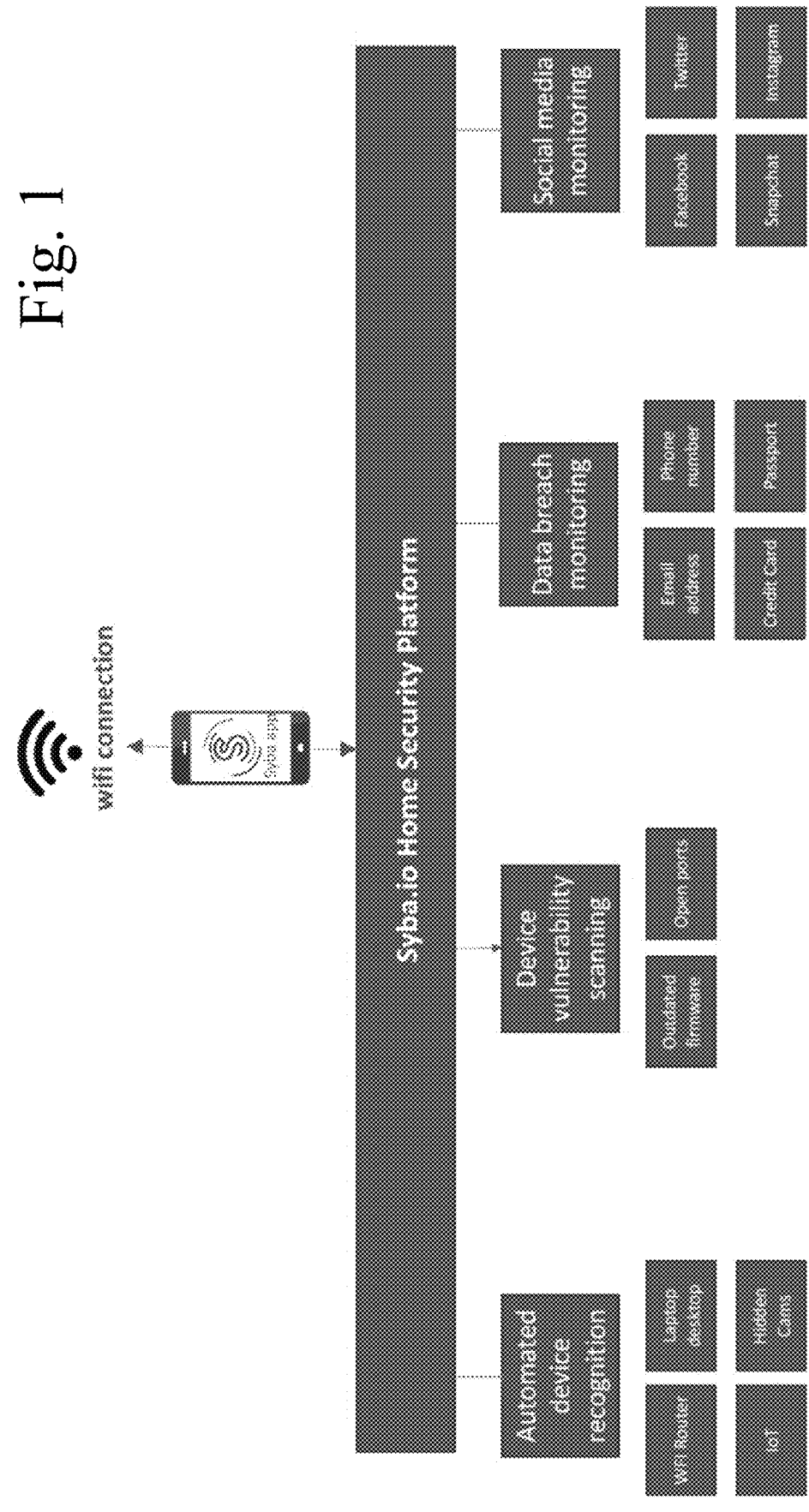
FIG. 1 shows a schematic representation of a security application, e.g., operating in accordance with an embodiment.

In describing preferred embodiments illustrated in the drawings, specific terminology is employed for the sake of clarity. However, the disclosure of this patent specification is not intended to be limited to the specific terminology so selected and it is to be understood that each aspect of the embodiments includes all technical equivalents that operate in a similar manner. In addition, a detailed description of known functions and configurations will be omitted when it may obscure the subject matter of the present invention.

In a preferred embodiment, various aspects discussed herein may be implemented in a security application (also referred to herein as "app", such as when referring to application front end or to client on the host device, and labelled as, for example, "Syba") for a smartphone or tablet-type device, although it should be apparent that many, if not all, of the aspects may be implemented for other devices such as laptop or desktop computers, smart TVs or smart displays (such as with an integrated connected or voice interface and speaker/microphone), other network-enabled devices (e.g., having a digital assistant integrated with a voice interface) such as in an IoT (Internet of Things) environment, etc. Further, in such preferred embodiment, the most common use of the security application is when the host device is connected to a home Wi-Fi (also referred to herein as "wifi" or "Wifi"). However, it should be understood that the security app can be configured for use on a host device even when such device is connected to a wireless LAN (local area network) other than a home wifi, or is connected to a wired LAN (e.g., via an Ethernet-type connection) or via another access point to the Internet.

In the preferred embodiment shown in FIG. 1, a security application configures the host device to have access to various functionalities of a security platform (labelled "Syba.io"). Although such security platform is labelled as a "Home Security Platform" in FIG. 1, it should be appreciated that the security platform has utility in environments other than a home.

Under such platform, the host device may optionally be set, for example, by the user, to perform automated (i.e., without user input to trigger) device recognition of devices connected to the wifi connection. Such device recognition provision can detect a Wifi router, laptop and desktop computers (as well as other devices, such as smartphones, tablets, etc., having computing capabilities), hidden cameras, IoT-enabled devices (e.g., motion or other sensors, appliances, etc.), as well as other devices (not shown, e.g., printers, multi-function devices, etc.) connected to the wifi. When making a connection to, for example, a wifi network, the app can scan for all connected devices and list them in an easy to understand and recognizable for people who are not so familiar with network topology.

The platform also provides the host device with functionality for device vulnerability scanning to determine vulnerabilities of each detected device (i.e., another device connected to the wifi) that enable a hacker to introduce a cyber attack onto the wifi. Examples of vulnerabilities are open ports, firmware that is not up to date on a device, etc.

The platform may also provide the host device with functionality for data breach monitoring, that is, as to the personal data of the user. For example, the data breach may be based on unauthorized access to the user's e-mail address, phone or mobile number, credit/debit card (or banking) information, passport (or other identification) information, etc. In the typical data breach against the user, databases registering information associated with such data breach associate the data breach with the user's e-mail address and/or phone or mobile number. Consequently, the app may be configured to permit the user to enter email addresses and phone numbers which the app will search in databases containing information regarding website and other data breaches. When data breach information associated with any of the email addresses and phone numbers is found, the app will notify the user.

Many people today regularly access, and participate in, social media and the typical social media user often has a concern that personal information or other information detrimental to the user's reputation or personal interest is on social media. Therefore, the platform also provides the functionality for the user to monitor social media (e.g., Facebook, Twitter, Snapchat, Instagram, etc.). The app prompts or permits the user to enter usernames which the user uses regularly on websites and/or social media to logon. The app will scan a large set of social media sites and return the list of social media sites where one or more of such usernames is used to logon.

Figure 2:
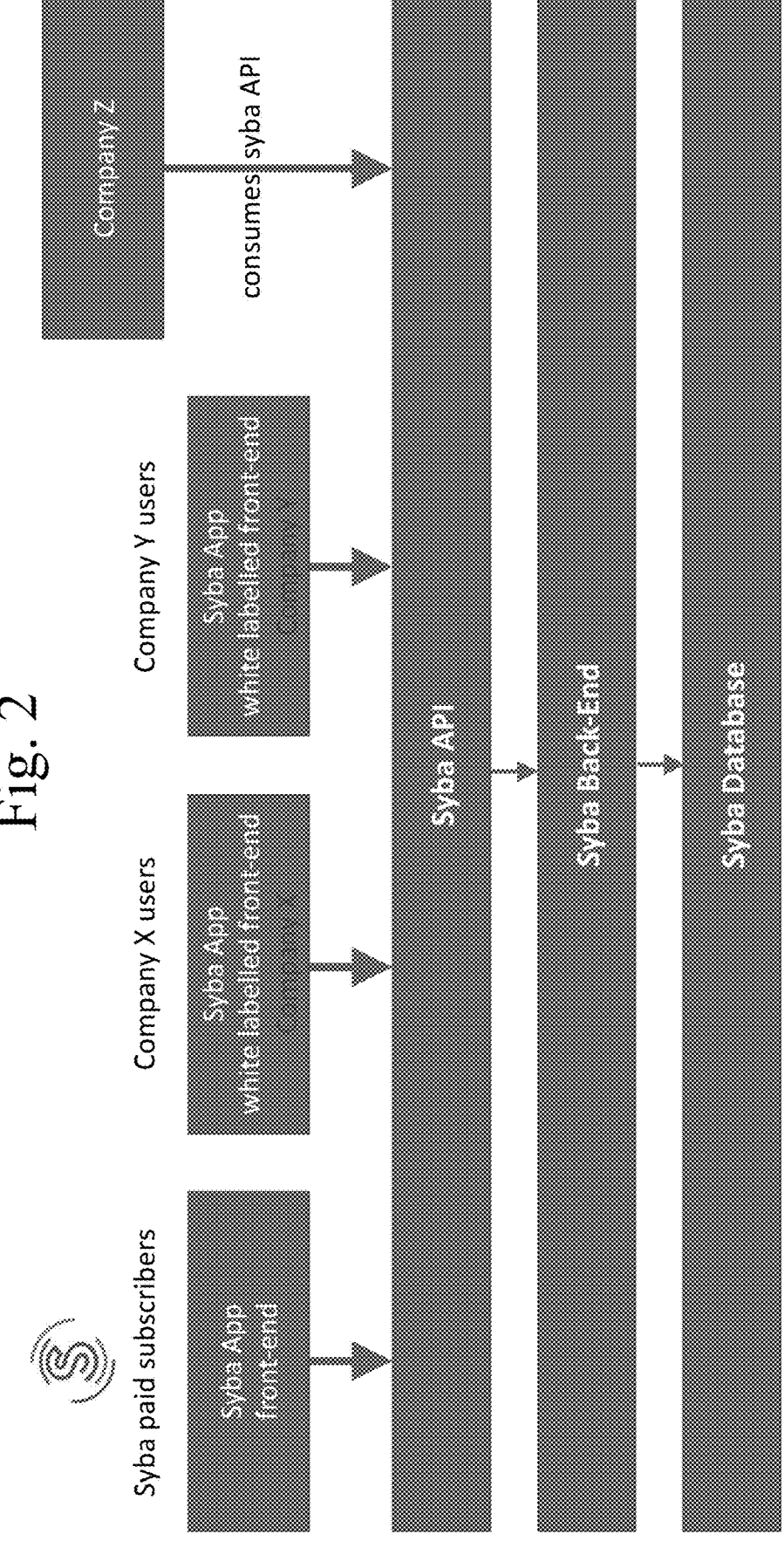
FIG. 2 shows a schematic representation wherein various users can access the security application shown in FIG. 1.

In the preferred embodiment shown in FIG. 2, a security application is implemented using a three-layer architecture and such a three-layer application may employ the MERN [MongoDB; Express.js; React Native; NodeJS] technology stack and may be deployed via Microsoft Azure.

Layer 1 is a front-end which is the layer for handling all user interaction. The collected data is sent to the back-end layer (layer 2). Further, such layer makes the connection with the wifi network. The front-end layer is also configured to facilitate network scans and forward the information from the network scans to the back end, which will then process it. The front-end can be developed in React Native which fits well with the different use cases for the app to run on multiple platforms (e.g., Android, ios, etc.). Apps developed using React Native can work on multiple platforms through emulators without much effort.

Layer 2 which is a back-end is configured to contain all application functions, e.g., device recognition, vulnerability scanning, data breach monitoring, social media monitoring. Further, back-end layer 2 maintains various databases to register data collected during operation of the application. The back-end can be developed using Express.js, a Node.js framework. Node.js provides an advantageous mix in terms of performance and compatibility with the front-end and database(s). Such back-end layer is configured to address the APIs that support the functionalities of our app, maintain communication with the database(s) and perform authentication. The data bases are created in MongoDB which facilitates storage of each piece of data as a JSON (Javascript Object Notation) object and thus allows data to be stored with variable structures easily, allows the database to achieve high performance, and additional data source to be easily (and quickly) connected, thereby increasing the number of items that can be monitored for data breaches (such as bank account numbers, credit card numbers, etc.).

An API (application programming interface) is basically a software intermediary that enables two computer programs (e.g., two applications) to talk to each other. For example, each time a user uses an app like Facebook, send an instant message, or check the weather on your phone, an API (typically on the app-side) facilitates the communication between a program on the user terminal and the app. An API is essentially an interface that specifies the language or format by which the requesting terminal (including the program running on that terminal) can communicate with, and thus obtain the benefits of, software-implemented functionalities provided by the app, for example, to obtain data or services from such app. Such API typically reveals to the requesting terminal one or more endpoints (e.g., URLs or how to formulate the required URLs) at which the data or functionalities can be obtained. The API also may instruct the requesting program or terminal as to the format of data that the app will be communicating to the requesting program or terminal.

Layer 3 provides an API (Application Programming Interface) and ensures secure interaction between the front-end and the back-end. As an API, the layer can also be called by other (i.e., external) applications or other software, distinct from the aforementioned front-end.

The three-layer arrangement also permits a multi-tenant front end in which one back-end server serves all tenants. For example, one group of tenants have access to the same fixed front-end (which has branding of "Syba" App), on a subscription basis. Some other tenants (Company X, Company Y) operate on a white-label basis where each white-labelling tenant can implement their branding (e.g., logo, coloring, etc.) to a blank front end without changing the layout of the front end, and pays for the freedom to customize the blank front end to their desired branding and pays a regular charge for access to the back-end. Another tenant (Company Z) provides their own front end integrated via the application API to the application back-end, and pays a fee for use of the API for integration to the back end. The API can be protected from unauthorized access by pushing a JWT [JSON (JavaScript Object Notation) Web Token] token transparently to the user device upon user login into the app. JWT tokens are commonly used to share security information between a client and a server, and a JWT token is signed using a cryptographic algorithm to ensure that the information contained in the token cannot be altered after the token is issued. Such token is used here by the security application to secure access when the app makes an API call.

Typical workflows in a preferred embodiment will now be discussed with reference to FIGS. 3-6.

Figure 3:
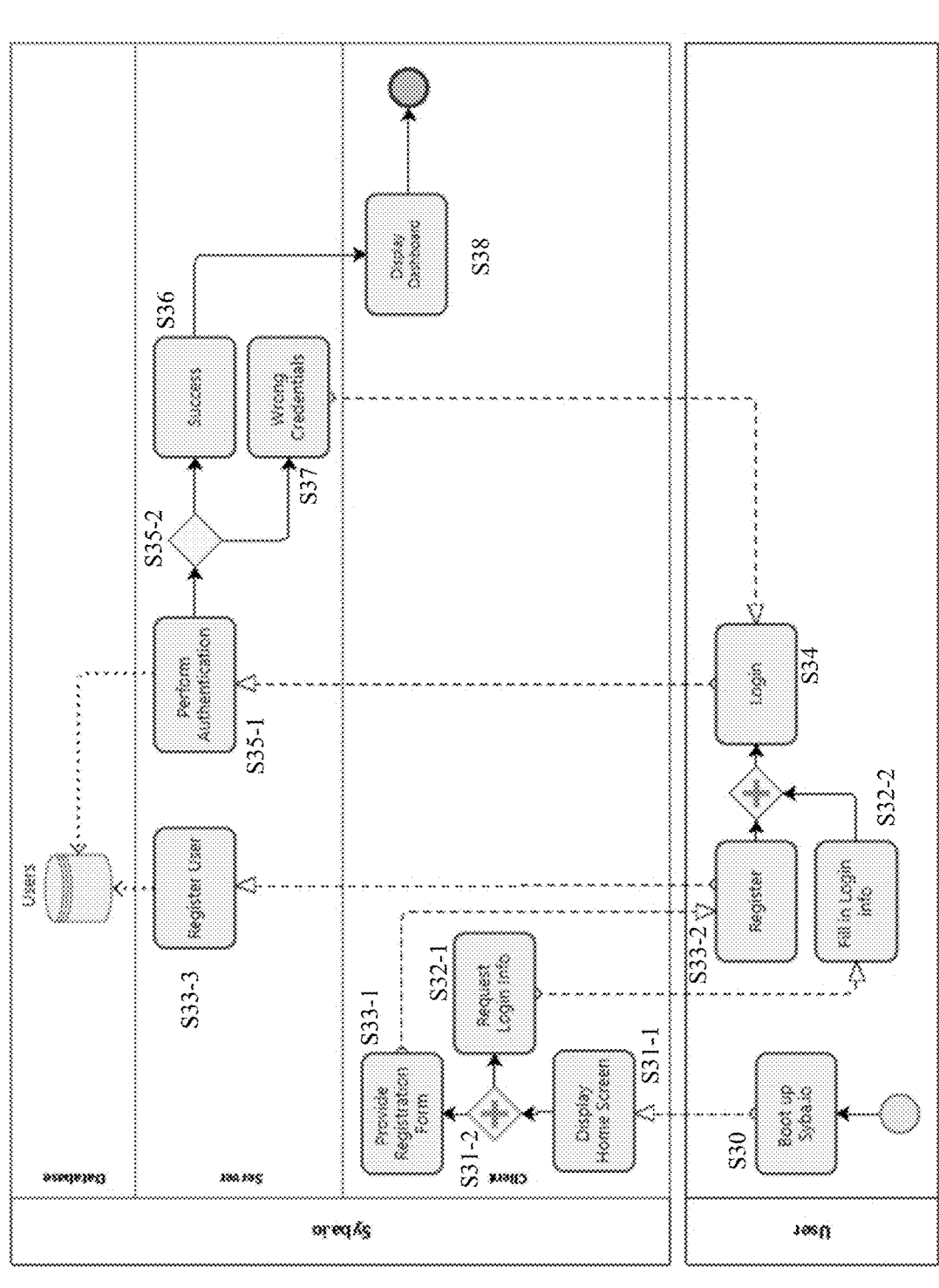
FIG. 3 shows a flow chart of a method for registration and login, such as performed via the security application shown in FIG. 1.

A process for securely registering login into the app, in a preferred embodiment is illustrated in FIG. 3. The app is obtained (not shown) through typical channels (e.g., preinstalled on host device; or on demand via a hyperlink on a Web page or in an email or text message; or common application sources, such as Apple App Store, Goggle Play Store, Microsoft Store, etc.). Alternatively, the app may be obtained on demand via a SaaS process through the Web.

In any event, with the objective of security, every user must have a valid token to login in. After the app is obtained, and when such app is booted up (S30), a home screen is displayed (S31). The app detects (S31-2) whether a valid token is present on the host device. If upon app boot-up, the required token is detected (S31-2, yes), the app prompts (S32-1) the user to provide login information.

If the required token is not detected (S31-2, no), the app prompts (S33-1) the user to provide registration information. After the user provides the requested registration information (S33-2) including user credentials (e.g., username and password or alternatively, input of biometrics of the user), a token linked to the user credentials is issued (and, for example, stored on host device) and the app communicates with the server to start a registration process (S33-3) which is performed on the back-end to register the registration information in a user database. In the meantime, the app prompts (S32-1) the user to provide login information.

Figure 4D:
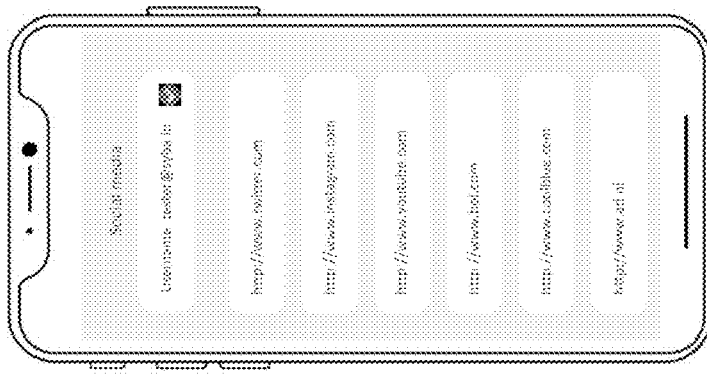
FIGS. 4A-4D show schematic representations of various services of a security application, such as shown in FIG. 1.
Figure 4C:
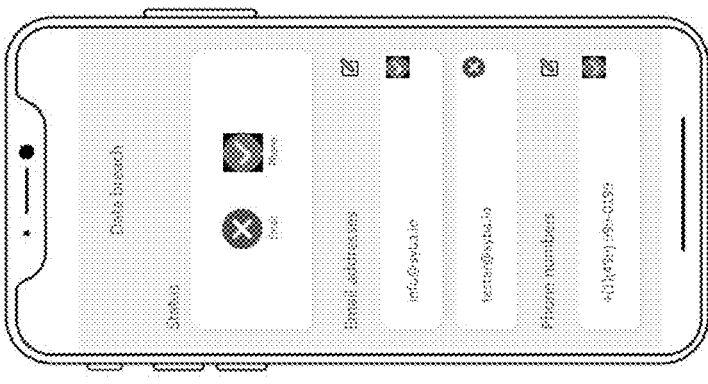
Figure 4B:
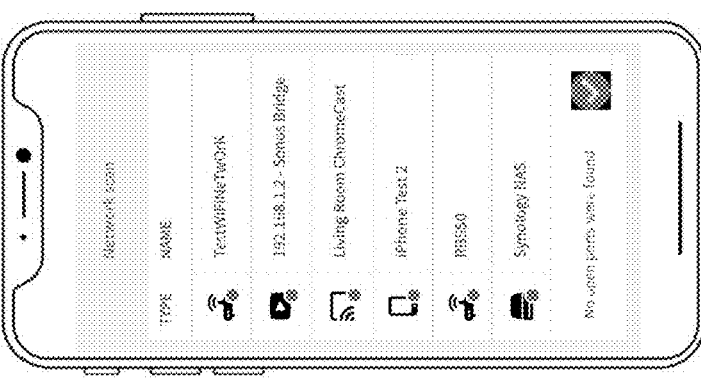
Figure 4A:
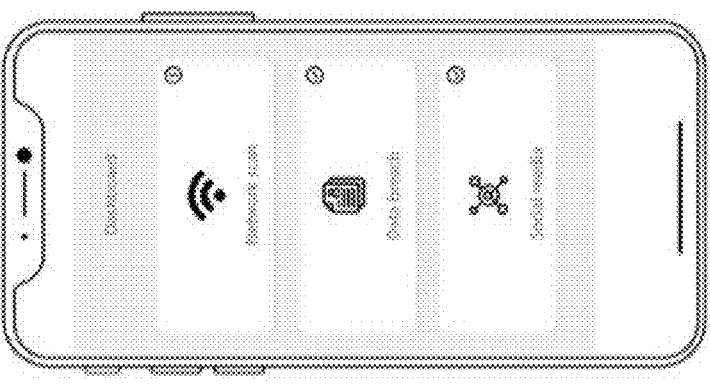

After the requested login information is provided (S32-2), the app starts a login process (S34) to communicate with the application server, for performing user authentication (S35-1) including verifying with reference to the data registered in the database whether the token on the client device is valid. If the user is authenticated (S35-2, yes; S36: Success), the application client displays a dashboard (S37), as shown in FIG. 4A. If the user is not authenticated (S35-2, no; S37: Wrong Credentials), the user is prompted once again to login.

Figure 5:
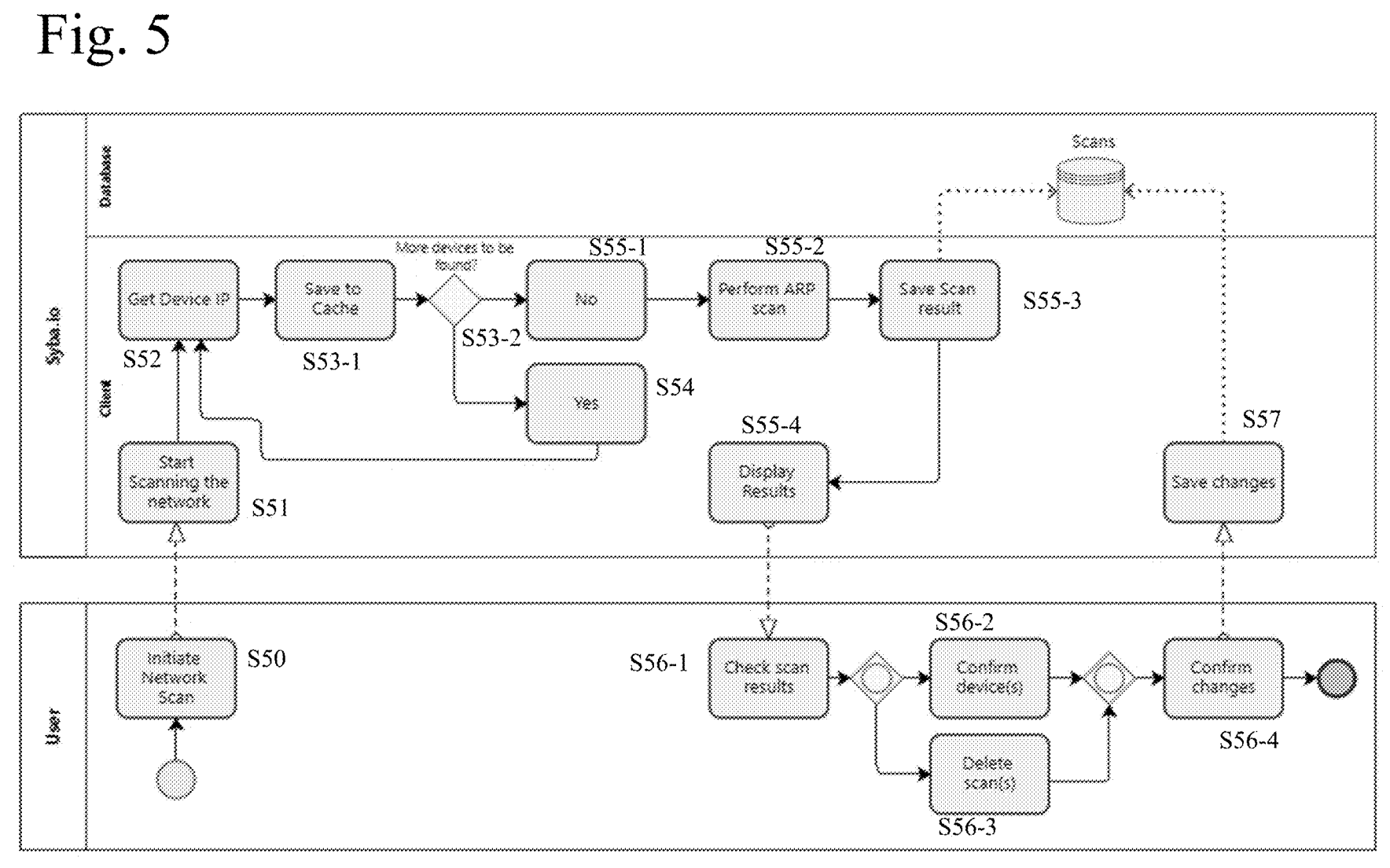

Upon successful login, a dashboard such as illustrated in FIG. 4A may be provided (S38) client-side. Such dashboard permits the user to select a network scan, as one available option. In such instance (S50 in FIG. 5), the process illustrated in FIG. 5 is triggered and the application client starts the network scan process (S51).

In such process, the security application proceeds to determine an IP address (S52) of each device that is connected to the local area network (LAN), such as a home wifi, which the host device is accessing via a router. For example, a ping scan (e.g., via an icmp packet or tcp packet) may be performed to scan each IP address, one-by-one, in the subnet corresponding to the LAN connected to the router. Alternatively, a ping sweep (e.g., Nmap ping sweep, ICMP sweep, etc.) of a specified range or collection (such as specified in a file) of IP addresses in the subnet may be performed. Other commands (e.g., netdiscover, arp-scan, etc.) may be employed to automate, at least partially, the process to determine the network addresses of the devices connected to the local wifi.

As each device connected to the local LAN responds (S52), in turn, with its IP address, such response (including address information) is cached (S53-1) and assuming some devices have not yet responded (S53-2, S54), the process (S52, S53-1, S53-2) to collect addresses of connected devices continues.

Once it is determined that all addresses in the subnet have been scanned (S53-2, S55-1), the application may perform other scans to collect additional connected device information. For example, the application proceeds (S55-2) to confirm, for each connected device, a MAC (media access control) address which is uniquely associated with a network interface controller of the connected device. Such network interface controller controls the process for the device to access, including connect to and disconnect from, a LAN. Such a network interface controller is a standard component of a network-enabled device and does not form a part of the inventive subject matter of this disclosure.

The application may request, via an ARP (Address Resolution Protocol) scan or command to the router, for each connected device, to return the MAC address registered in association with the IP address, in an ARP table maintained by the router. The MAC address associated with an IP address may also be obtained via other commands (e.g., Nmap, netdiscover, etc.).

In many instances, the scan command (e.g., Nmap, arp –a, ping –a, etc.) may be configured to return the device name associated with the IP address. On the other hand, a mDNS (multicast Domain Name System) scan or command may be used to confirm device names as well.

In any event, the scan results are preferably registered (S55-3) in a device scan database, for future reference, and displayed (S55-4) by the app on the client, to permit the user to check the scan results (S56-1), and confirm the devices (S56-2). For example, a list of devices may be presented so that the user can confirm the devices the user recognizes.

The data registered in the device scan database can have various advantageous uses. For example, it might be used to determine how long a device has been connected and when it is detected that the device has a vulnerability, it can be determined whether such vulnerability is relatively recent. Further, the device information of one device may be useful for determining device information of a similar connected device. However, it is not intended for the scan results to be kept in the device scan database for a long time, and therefore the number of scans registered in the database can be limited to a predetermined number. Accordingly, when scan results are displayed, the user may be permitted to specify that those results or other scan data are to be deleted (S56-3) and then the user is prompted to confirm the changes (S56-4). Upon user confirmation of changes, the changes are communicated to the application back-end, to conform the data registered in the database (S57).

Figure 6:
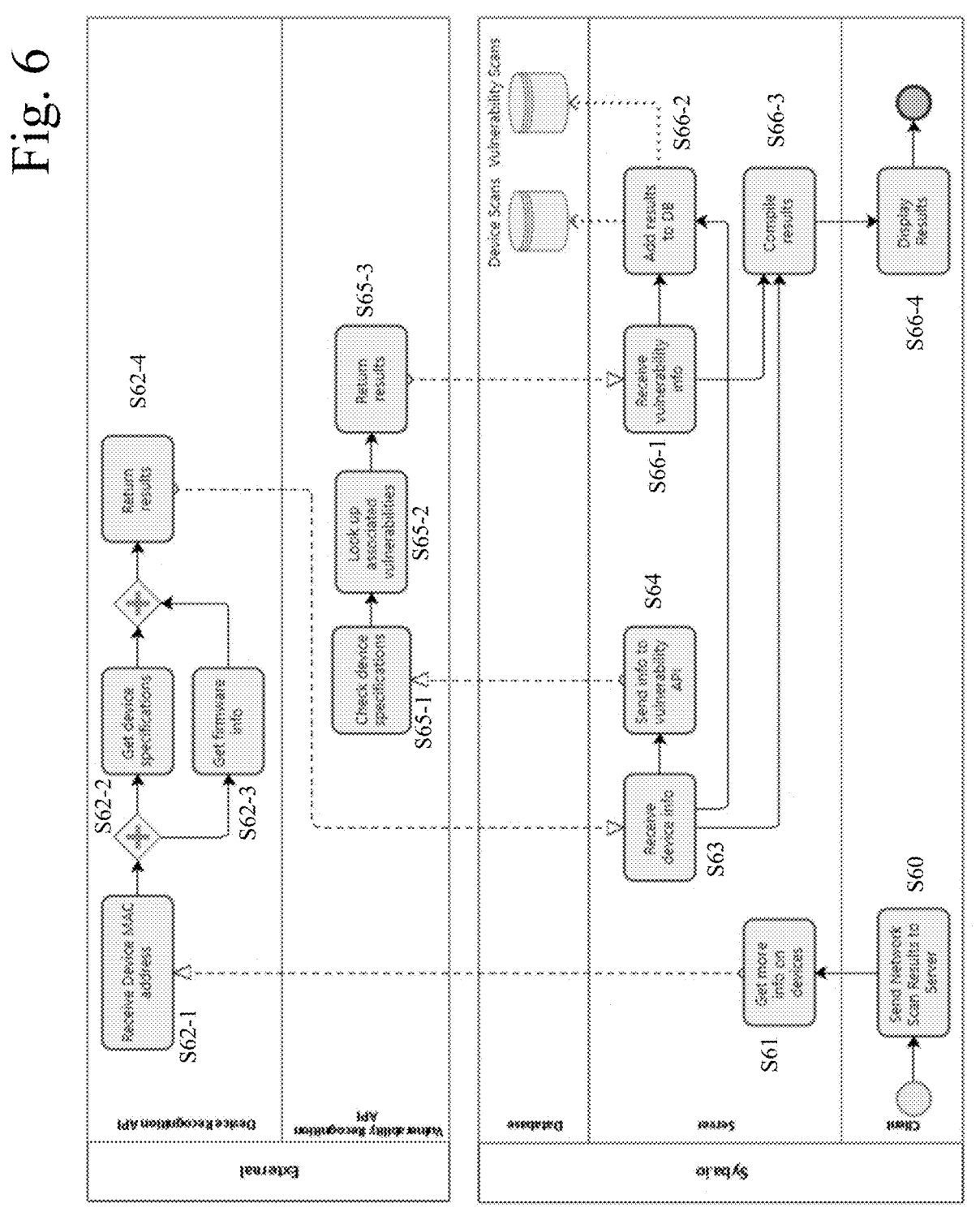

In a preferred embodiment, a subprocess as illustrated in FIG. 6 is performed after the scan results have been confirmed by the user and communicated to the application back-end (S60). As mentioned supra, after all addresses in the subnet have been scanned to determine the devices that are connected to the LAN, the application may perform additional scans to collect additional connected device information. In short, it is generally helpful to have the following information for each connected device: network name; network IP address; MAC address; device name; device type; device manufacturer; and device model. In addition, if a connected device has vulnerabilities, such as open ports through which hackers can readily infiltrate the device and/or the network, such vulnerabilities should be identified.

In the subprocess, the application proceeds (S61) to obtain more information regarding each connected device. For example, the MAC address may be decoded to extract the manufacturer's registered identification number or an OUI (organizationally unique identifier) which is a 24-bit number that uniquely identifies a vendor, manufacturer, or other organization. For each connected device, the associated MAC address may be supplied to any of the numerous tools or SaaS services that can perform MAC address or OUI lookup and provide manufacturer information based on MAC address.

An Nmap command, or another command (e.g., lshw in linux, etc.), can be sent to each connected device to obtain a reply from the connected device indicating its device type and/or device model. In addition, manufacturer and model information may be obtained through some SaaS services or portals (e.g., macvendors.com, etc.), via API or otherwise.

In addition, the application may scan each connected device and the router, to determine open ports. For example, common ports that might be open include the following:

21—FTP (File Transfer Protocol)
    22—SSH (Secure Shell)
    23—Telnet
    25—SMTP (Mail)
    80—HTTP (Web)
    110—POP3 (Mail)
    143—IMAP (Mail)
    443—HTTPS (Secure Web)
    445—SMB (Microsoft File Sharing)
    3389—RDP (Remote Desktop Protocol)

Various commands (e.g., netstat nmap –sT, –ab, ss, lsof, etc.) and port scanner tools (e.g., Spiceworks IP Scanner) can be used.

For each device, the MAC address and/or the device type, manufacturer and model information are used to query (S62-1) resources (e.g., phonedb.net; specdevice.com; devicespecifications.com; phonearena.com; back4app.com; etc.) external to the network and/or the various databases maintained by the application, for obtaining device specification (S62-2) and firmware version information (S62-3) pertinent to the make and model of the connected device. Upon the databases and/or external resources returning the requested information (S62-4), such device specification and firmware version information received (S63) from the databases and/or external resources is assembled with other connected-device information into a request to send via an API (S64) to an external database or data source (e.g., Shodan) which is configured to check the received device specification and device information (S65-1), compare such specification and information with its vulnerability database (S65-2), and return results indicating vulnerabilities of a device specified by the received device specification and device information (S65-3). Upon receiving (S66-1) information from the external source regarding such device vulnerabilities, the application saves (S66-2) the device vulnerability information in a vulnerability scan database maintained by the application and compiles (S66-3) the vulnerability information and the scan results which were sent to the back-end, for display (S66-4) by the app in a user-comprehensible manner (see, for example, FIG. 4B).

The dashboard in a preferred embodiment (FIG. 4A) permits the user to select a provision to check for data breaches or a provision to scan social media. Workflows for both are integrated in FIG. 7. However, it should be appreciated that one workflow is triggered by selection of the corresponding dashboard provision, without triggering the other workflow.

In any event, user data, such as login information, name, phone numbers, email addresses, other personal data (e.g., social security number, payment information, etc.) identifying, or associated with, the user, are collected (S70), typically in advance (such as during registration or another time), and registered in a users database maintained by the application. When the user selects dashboard provision to check for data breach, the application sends (S71) the user data to an API of one or more data breach databases (e.g., CyberScout) registering known instances of data breach associated with user-identifying information and in which database search is provided as a SaaS service, a Web service, or otherwise via a secured connection through the Internet, etc. Upon receiving a service request including such user data (S72-1), the API for a data breach database formulates a query based on the user data, searches the database for matches to any of the user data (S72-2), and returns the results (S72-3).

When the results are received (S73) from the data breach database, the application adds (S77-1) the data breach scan results in a breach scan database and the app compiles (S77-2) the results for display (S77-3) as an easy to understand notification (see, e.g., FIG. 4C) to the user. For example, in a preferred embodiment, when the search is based on e-mail addresses and phone number, as the specified user data, the app may indicate (for each of the user e-mail addresses and phone number) whether there was a data breach as to that personal data.

When the results in response to the query submitted to data breach database indicate data breaches that match the query based on the specified user data, the notification displayed by the app may additionally include a user option to view details as to each of the data breaches associated with the personal data of the user (see, e.g., FIG. 7A).

For example, once the end-user has installed the app, the end-user can enter one or more email addresses for which the back-end would check whether such email addresses are found in known data breaches. The end-user can initiate the scan itself. However, once the back-end has received the email address, it will once a day automatically scan the different data sources to see whether there are no new breaches found for such email addresses. If new data breaches are found, a notification is pushed to the end-user's smartphone requesting to check the data breach function in the app.

Figure 7:
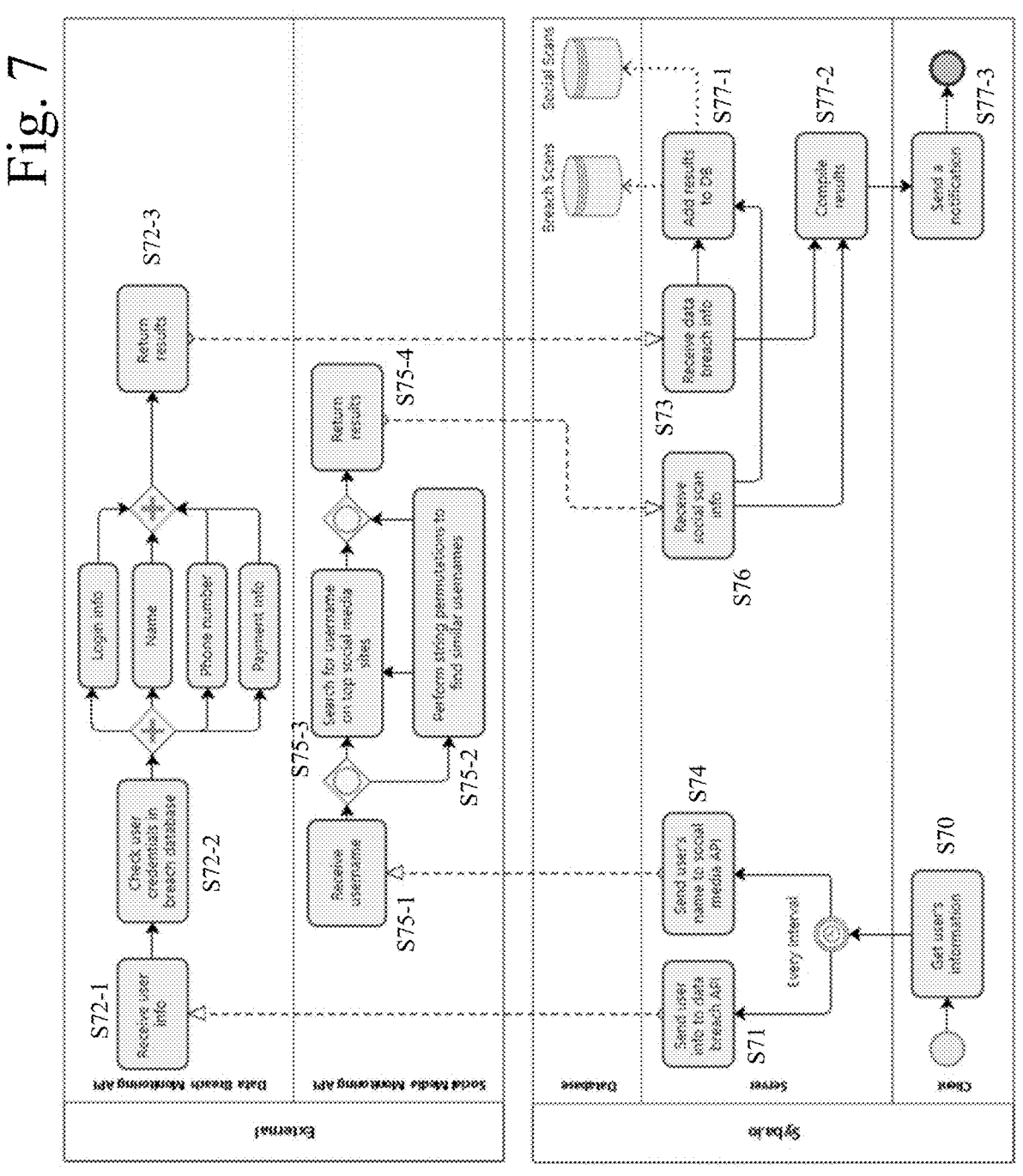
FIG. 7 shows a flow chart of a method that can be performed by a security application, such as shown in FIGS. 4A-4D.

Further, although not illustrated in FIG. 7, the requested data breach scan can additionally include look-up in the breach scan database, with reference to the user specified data.

When the user selects the provision for a social media scan, the application collects the already-entered user data (S70) and sends (S74) the user data (e.g., username) to an API of a social media scanner (e.g., Sherlock tool provided by Sherlock Project) which scans, on demand based on specified terms (e.g., username and string permutations of such username), top social media sites. Upon receiving a service request including such user data (S75-1), the API for the social media scanner formulates a sequence of searches based on the received term(s), and the scanner causes such sequence of searches, here, specified username (S75-3) and string permutations (S75-2) of such username, to be executed on each of the top social media sites. When time permits, the formulated searches may have no time limitations. Since the time duration for searching one social media site is likely to be significantly different than other social media sites, the results of each search may be returned (S76) to the application as the search is completed without necessarily being synchronized to completion of the other searches, and in such instance, the application may proceed upon returning the results (S76) of one search by the scanner, to add (S77-1) the results of the search to a social scans database.

However, in a preferred embodiment, notification to the user of the results will be withheld until after all of the searches in the sequence are completed by the scanner. Upon such completion of all of the searches in the sequence and return by the scanner of the results of all of the searches, the application compiles (S77-2) such results of all of the searches into a notification for display (S77-3) by the app in a manner that is easy to understand (see, e.g., FIG. 4D) to the user.

Figure 7B:
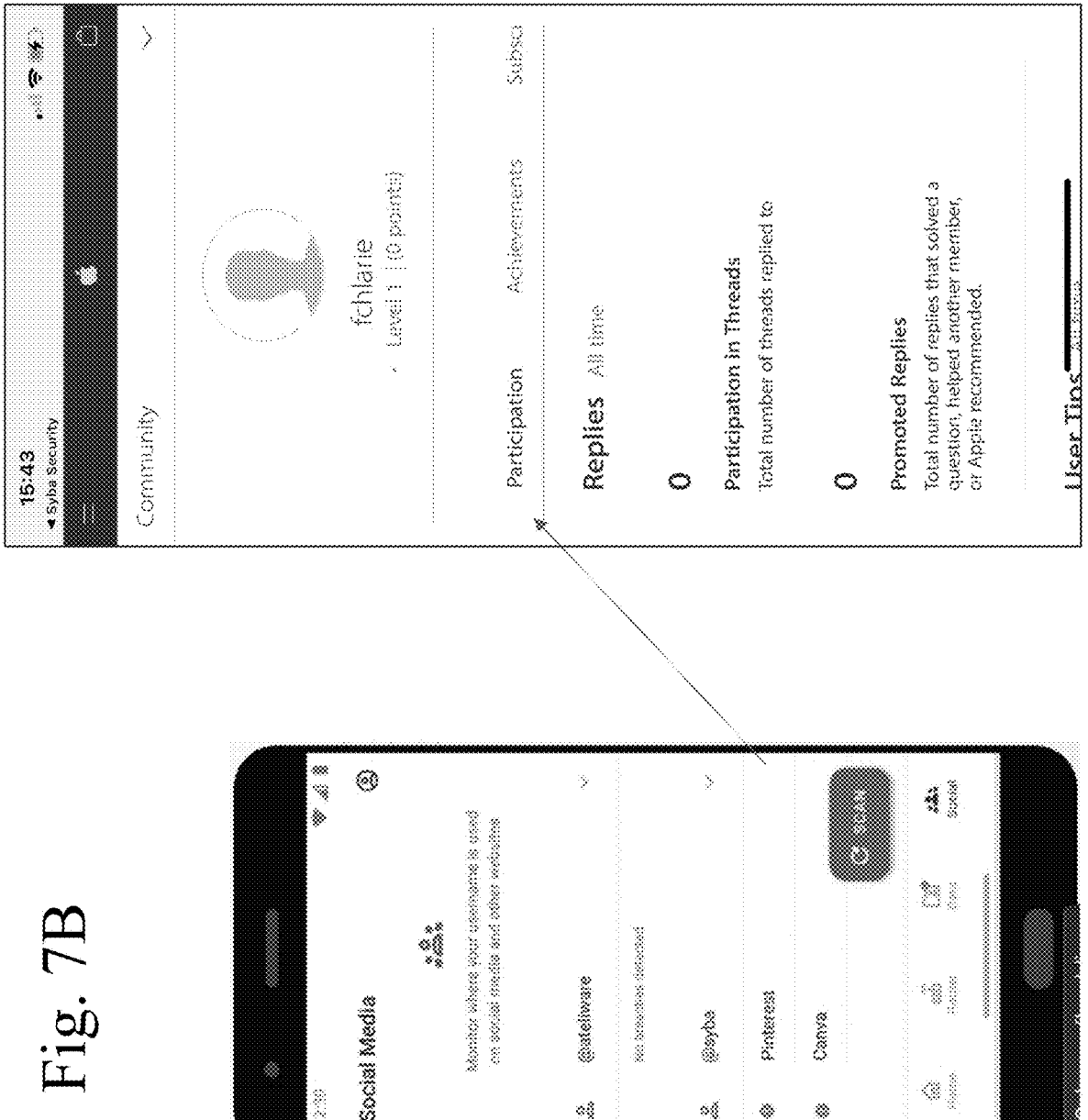
FIG. 7B shows a schematic representation of a social media scan function, such as shown in FIG. 4D.

For example, in the preferred embodiment, the notification may provide a list of the social media sites where the username (and/or string permutations thereof) were found (see, e.g., FIG. 7B). Although not shown in the drawings, the notification displayed by the app may additionally include a user option to view details as to (e.g., hyperlinks) to where on each of the listed sites the username (and/or string permutations thereof) was found.

For example, once the end-user has installed the app, the end-user can enter a user name for one or more social media, and the back-end checks where the user names are known on social media websites. The end-user can initiate the social media scan itself. Once the back-end has received the user names, it automatically (e.g., once a day) scans the different social media websites to see whether there are new social media websites on which the listed user names is known. If new social media websites are found, a notification is pushed to the end-user's smartphone requesting to check the social media function in the app.

Some additional exemplary embodiments are discussed below.

In the exemplary embodiment shown in FIG. 8, a method, performed by a security application, for reducing risk of cyber-attack of a user terminal connected via a router to a local wireless LAN (local area network), includes (a) scanning each IP address in a subnet including the local wireless LAN, to determine devices which are connected to the wireless LAN, and obtaining, for each particular device amongst the devices connected to the wireless LAN, connected device information specific to the particular device, the connected device information including an IP address of the local wireless LAN and a MAC (media access control) address uniquely associated with a network interface controller of the particular device (S81), (b) performing a vulnerability scan, for the each particular device determined in (a) to be connected to the wireless LAN, including using the MAC address uniquely associated with the network interface controller of the particular device, to obtain additional device-associated information from a data source or external database which is external to the wireless LAN, the additional device-associated information for at least one of the each particular device including device vulnerability information associated with the particular device (S83), and (c) providing, in a user-comprehensible manner, the connected device information and the device vulnerability information for the at least one of the each particular device (S85).

Figures 9A, 9B, 9C:
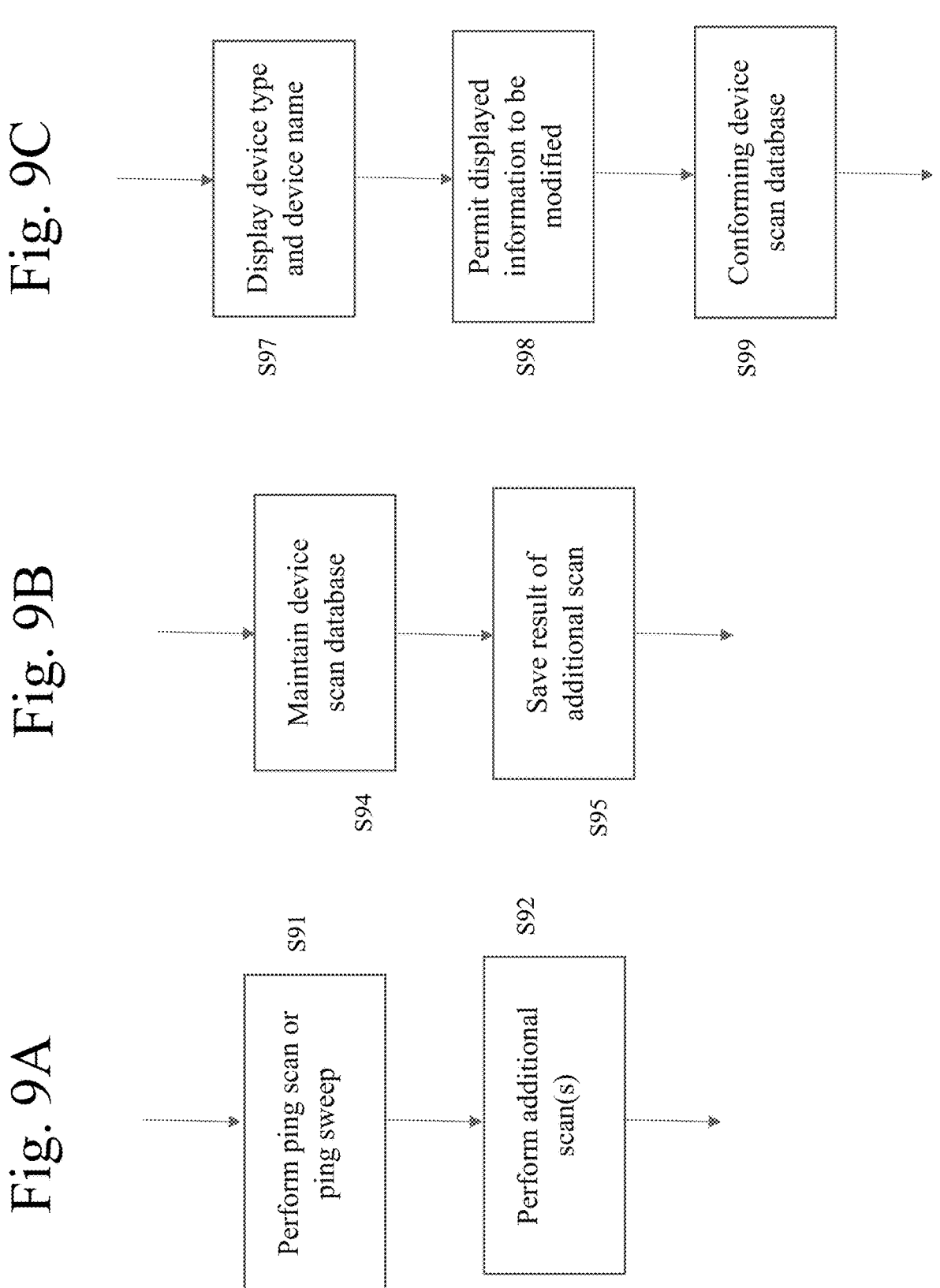
FIGS. 9A to 9C show flow charts of methods that can be performed by the security application shown in FIG. 1.

In such method, the scanning can optionally include (as shown in FIG. 9A) (a1) performing a ping scan or a ping sweep, to determine IP addresses in the subnet that are in use by the devices connected to the wireless LAN (S91), and (a2) performing one or more additional scans, at least one of the additional scans using the IP addresses determined in (a1), to determine the connected device information for each connected device amongst the devices connected to the wireless LAN, the connected device information including, in addition to the MAC address uniquely associated with the network interface controller of the connected device, a device name of the connected device (S92). The additional scans in (a2) can optionally include an ARP (Address Resolution Protocol) scan, including for each IP address amongst the IP addresses determined in (a1), a request to the router to return the MAC address registered in association with the IP address, in an ARP table maintained by the router, and a mDNS (multi-cast Domain Name System) scan on the wireless LAN to request, for each connected device amongst the devices connected to the wireless LAN, the connected device to confirm the device name of the connected device.

Such method can optionally further include (as shown in FIG. 9B) (a3) maintaining a device scan database (S94), and (a4) saving in the device scan database a result of the additional scans performed in (a2), including the connected device information determined in (a2) for the each connected device (S95), wherein the additional device-associated information can be obtained in (b) from the device scan database or another data source or external database, and the additional device-associated information for the connected device can include one or more of a device type, a device manufacturer and a device model of the connected device.

Such method can optionally further include (as shown in FIG. 9C) (a6) displaying on the user terminal, for the each connected device, the connected device information associated with the connected device, the displayed connected device information including at least the device type and the device name of the connected device (S97), (a7) permitting, by the security application, the displayed connected device information to be modified from the user terminal (S98), and (a8) when the displayed connected device information is modified from the user terminal in (a7), updating the device scan database to conform to the modified information (S99). In (a7), the security application can optionally permit the displayed connected device information to be deleted entirely, from the user terminal.

For each particular device, the additional device-associated information obtained in (b) can optionally include a device specification and firmware version of the particular device, determined based on the MAC address uniquely associated with the network interface controller of the particular device, and the device vulnerability information for at least one of the each particular device can be obtained in (b) from the data source or external database by look-up with reference to the device specification and firmware of the particular device.

The additional scans performed in (a2), for each connected device amongst the devices connected to the wireless LAN, can optionally include a scan to obtain a reply from the connected device including information corresponding to one or more of a device type, a device manufacturer and a device model of the connected device.

Figures 10A, 10B:
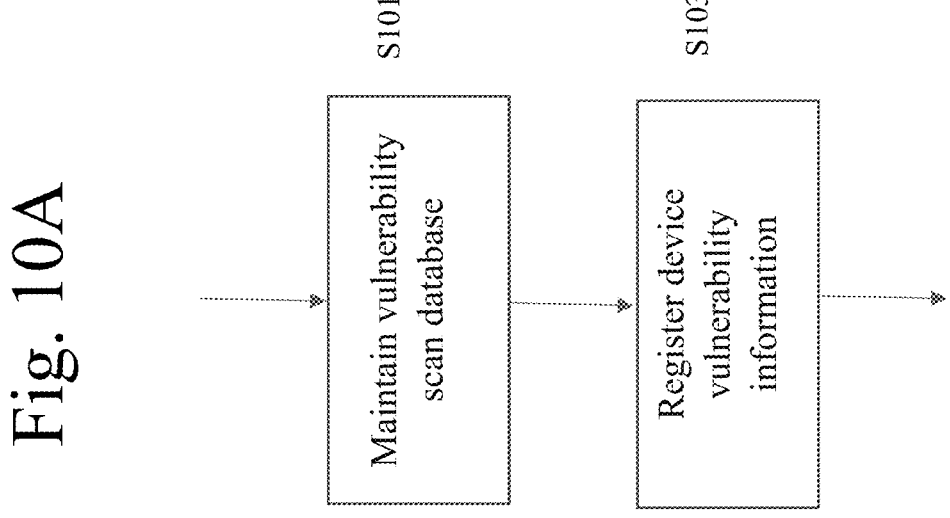
FIGS. 10A to 10B show flow charts of methods that can be performed by a security application, such as shown in FIGS. 4A-4D.

The method, for reducing risk of cyber-attack of a user terminal connected via a router to a local wireless LAN (local area network), can further include (as shown in FIG. 10A) maintaining, by the security application, a vulnerability scan database (S101), and registering, by the security application, in the vulnerability scan database, the device vulnerability information obtained in (b), in association with the connected device information, for the corresponding particular device (S103). The vulnerability scan performed in (b) can also include (b1) for each connected device, using the MAC address uniquely associated with the network interface controller of the connected device, to look-up in the vulnerability scan database with reference to the MAC address associated with the connected device, and when the look-up in the vulnerability scan database includes matches of the MAC address associated with the connected device to registered device vulnerability information, the notification in (c) can also be based on the registered device vulnerability information which is matched to the MAC address.

The method can optionally further include (as shown in FIG. 10B) determining, by the security application, based on the device vulnerability information, that user action is required (S106), and displaying a message on the user terminal including helpdesk contact information for obtaining guidance as to the required user action (S108).

Figures 11A, 11B:
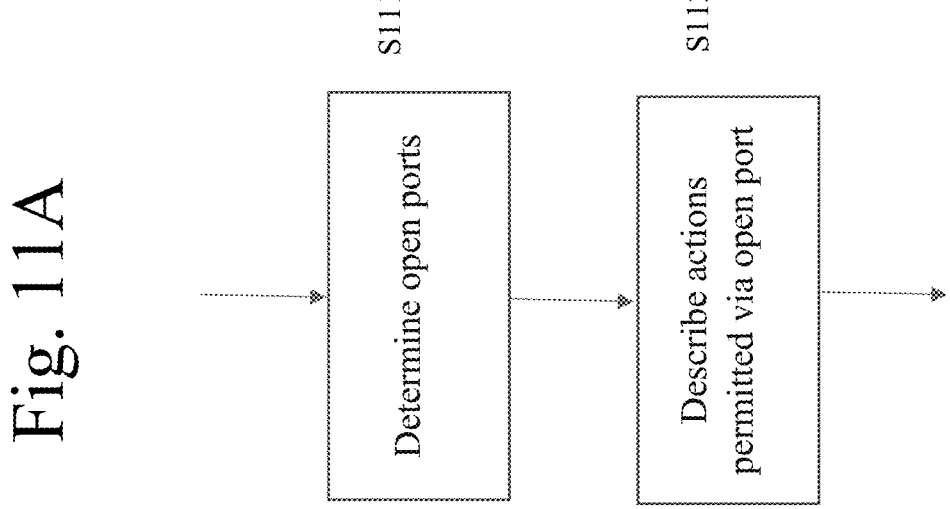
FIGS. 11A to 11B show flow charts of methods that can be performed by a security application, such as shown in FIGS. 4A-4D.

The method can optionally further include (as shown in FIG. 11A) (d) connecting to the wireless LAN and scanning the router and each connected device, to determine open ports (S111), and (e) displaying on the user terminal, in a user-comprehensible manner, information indicating the open ports and for each open port, a description of actions that are permitted via the open port (S113). The method optionally can additionally include (as shown in FIG. 11B) determining, by the security application, based on the open port determined in (d) and the actions that are permitted via at least one of the open ports, that user action is required (S116), and displaying a message on the user terminal including helpdesk contact information for obtaining guidance as to the required user action as to the at least one of the open ports (S118).

In another exemplary embodiment, which is shown in FIG. 12, a method for reducing risk from data breach of personal data of a user of the security application includes (A) obtaining user-identifying information of the user (e.g., email address of the user, a phone number of the user, etc.) (S121), (B) scanning for data breaches, including transmitting a query, based on the user-identifying information, to each of one or more data breach database registering known instances of data breach associated with the user-identifying information (S123), and (C) when a response to the query includes data breach information indicating one or more data breaches that match the query based on the user-identifying information, transmitting to the user, or displaying via the security application on a client terminal of the user, a notification of the data breaches associated with the personal data of the user (S125).

Figure 13:
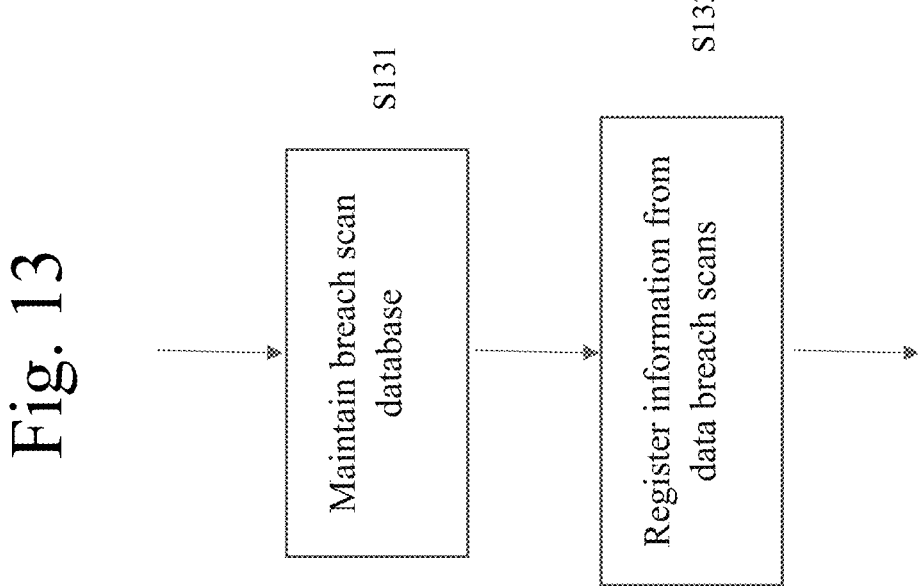
FIG. 13 shows a flow chart of a method that can be performed by a security application, such as shown in FIGS. 4A-4D.

Such method can optionally further include (as shown in FIG. 13) maintaining, by the security application, a breach scan database (S131) and registering, by the security application, in the breach scan database, information from data breach scans for plural users (S133), the scanning in (B) for data breaches additionally including look-up in the breach scan database with reference to the user-identifying information of the user.

When the look-up in the breach scan database includes matches of the user-identifying information to registered data breach information associated with the personal data of the user, the notification in (C) can optionally be based on the registered data breach information. The data breach information indicating the data breaches associated with the personal data of the user can optionally include at least one from the group consisting of login information of the user, name of the user, the phone number of the user, and payment information associated with the user. The notification in (C) can optionally indicate whether there has been a data breach associated with the email address in the user-identifying information of the user and also indicates whether there has been a data breach associated with the phone number in the user-identifying information of the user.

Figure 14:
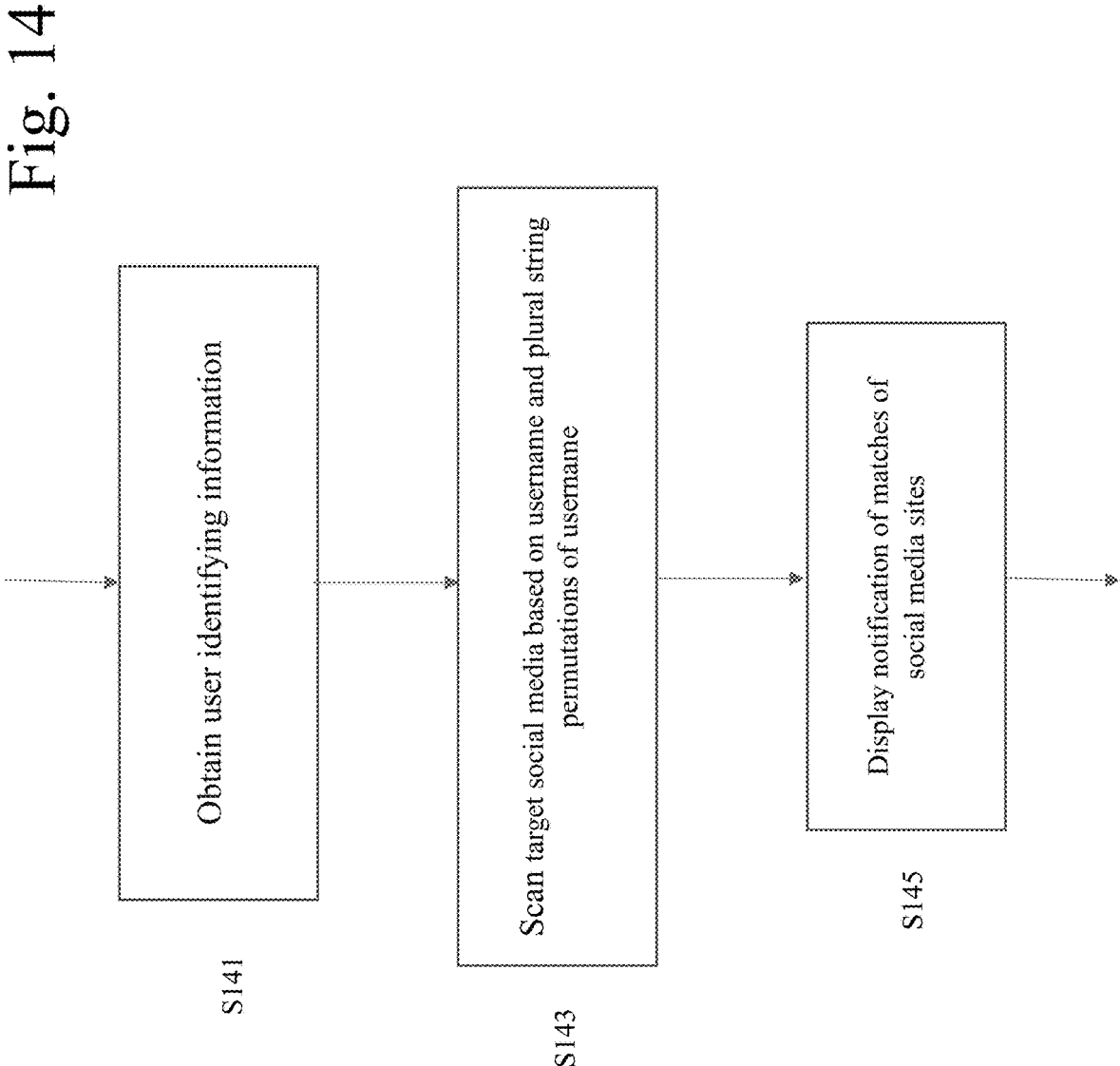
FIG. 14 shows a flow chart of a method that can be performed by a security application, such as shown in FIGS. 4A-4D.

In another exemplary embodiment, which is shown in FIG. 14, a method, performed by a security application for reducing risk from impersonation of a user of the security application on internet websites, includes (I) obtaining user-identify information of the user, the user-identifying information including one or more usernames of the user (S141), (II) communicating with each target social media amongst one or more social media sites, via an API (Application Programming Interface) of the target social media, to scan the target social media for each username amongst the one or more usernames of the user, based on the username and plural string permutations of the username (S143), and (III) when communications with the respective social media yield matches based on scans for the username and the string permutations of the username, compiling results of the matches and displaying via the security application on a client terminal of the user a notification of the matches on the social media sites (S145). The notification displayed in (III) via the security application on the client terminal can optionally indicate for each username, URLs (Uniform Resource Locators) to specific sites amongst the social media sites on which matches were found based on scans in (II) of the username and the string permutations of the username.

The above specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

One skilled in the art will appreciate, for example, that embodiments of the invention may be interfaced to and controlled by computer readable storage media having stored thereon one or more computer programs to be executed on one or more computers. Each computer readable storage medium includes a plurality of components such as one or more of electronic components, hardware components, and/or computer software components. These components may include one or more computer readable storage media that generally stores instructions which collectively, when executed, constitute the security application disclosed herein. Examples of such computer readable storage media include a recordable data storage medium of a computer and/or storage device, such as, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art.

A listing of claims is appended to this detailed description and various inventive aspects are described in such claims in the listing. However, such aspects as well as other inventive aspects would also be apparent to the skilled person upon reading the detailed description herein, with some reference to the drawings.

What is claimed is:

1. A method performed by a security application executing on a mobile user terminal connected to a local wireless network, the method performed by the security application executing on the mobile user terminal comprising:

(a) scanning the local wireless network, to obtain, for each particular device amongst devices connected to the wireless network, connected device information specific to the particular device, the connected device information including address information associated with the particular device;

(b) performing by the security application a vulnerability scan of said each particular device among the devices connected to the wireless network, to obtain by the security application vulnerability scan results, said vulnerability scan including identifying suspect open ports through which a prospective hacker can infiltrate the user terminal from the particular device;

(b1) using the address information of the particular device, to obtain additional device-associated information from a data source or external database which is external to the wireless LAN, the additional device-associated information including a device specification and device vulnerability information associated with at least one specific device among the devices; and (c) providing, in a user-comprehensible manner and by the security application, the connected device information, the vulnerability scan results and device vulnerability information, including the suspect open ports identified in (b), and providing guidance as to user action on the user terminal as to the suspect open ports.

2. The method of claim 1, further comprising:

(a2) performing one or more additional scans, to determine the connected device information for each connected device amongst the devices connected to the wireless network, the connected device information including, in addition to the address information associated with the connected device, a device name of the connected device;

(a3) maintaining a device scan database; and (a4) saving in the device scan database a result of the additional scans performed in (a2), including the connected device information determined in (a2) for the each connected device, the additional device-associated information being obtained in (b1) from the device scan database or another data source or external database, and the additional device-associated information including one or more of a device type, a device manufacturer and a device model of the connected device.

3. The method of claim 2, further comprising:

(a6) displaying on the user terminal, for the each connected device, the connected device information associated with the connected device, the displayed connected device information including at least the device type and the device name of the connected device;

(a7) permitting, by the security application, the displayed connected device information to be modified from the user terminal; and (a8) when the displayed connected device information is modified from the user terminal in (a7), updating the device scan database to conform to the modified information.

4. The method of claim 3, wherein in (a7), the security application permits the displayed connected device information to be deleted entirely, from the user terminal.

5. The method of claim 1, wherein for each device among the devices connected to the wireless network, the additional device-associated information obtained in (b1) additionally includes a firmware version of the device, determined based on the address information associated with the device, and the device vulnerability information for the device is obtained in (b1) from the data source or external database by look-up with reference to the device specification and firmware of the device.

6. The method of claim 1, further comprising:

maintaining, by the security application, a vulnerability scan database; and registering, by the security application, in the vulnerability scan database, the device vulnerability information in association with the connected device information, for the corresponding device.

7. The method of claim 6, wherein the vulnerability scan performed in (b) also includes, for each connected device, using the address information associated with the connected device, to look-up in the vulnerability scan database with reference to the address information associated with the connected device, and when the look-up in the vulnerability scan database includes matches of the address information associated with the connected device to registered device vulnerability information, a notification based on the registered device vulnerability information which is matched to the address information is provided.

* * * * *